(12) United States Patent
Clark et al.

(10) Patent No.: US 7,721,500 B2
(45) Date of Patent: *May 25, 2010

(54) MULTI-LAYERED FIRE DOOR AND METHOD FOR MAKING THE SAME

(75) Inventors: Randy Jon Clark, Klamath Falls, OR (US); Gary Lee Koepke, Klamath Falls, OR (US); Keith Lynn Lewallen, Salado, TX (US); Brent David Olson, Klamath Falls, OR (US); William Robert Transue, Klamath Falls, OR (US)

(73) Assignee: JELD-WEN, inc., Klamath Falls, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/656,628

(22) Filed: Jan. 23, 2007

(65) Prior Publication Data
US 2007/0125044 A1    Jun. 7, 2007

Related U.S. Application Data

(63) Continuation of application No. 10/284,392, filed on Oct. 31, 2002, now Pat. No. 7,185,468.

(51) Int. Cl.
*E06B 3/70* (2006.01)
(52) U.S. Cl. ............... 52/455; 52/794.1; 52/784.11; 52/783.13; 52/309.9
(58) Field of Classification Search ............ 52/455, 52/794.1, 205.4, 210, 784.11, 783.13, 232, 52/784.1, 784.15, 309.9; 428/318.4, 532; 49/501
See application file for complete search history.

(56) References Cited

U.S. PATENT DOCUMENTS

| 619,676 A | 2/1899 | Cronin |
| 670,939 A | 4/1901 | Rapp |
| 877,922 A | 2/1908 | Gager |
| 1,183,842 A | 5/1916 | Alling |
| D132,040 S | 4/1942 | Cummings |
| 2,343,740 A | 3/1944 | Birmingham |

(Continued)

FOREIGN PATENT DOCUMENTS

AT    372495 B    10/1983

(Continued)

OTHER PUBLICATIONS

PCT search report corresponding to PCT/US03/34373, mailed on Mar. 17, 2004.

(Continued)

*Primary Examiner*—Richard E Chilcot, Jr.
*Assistant Examiner*—Chi Q Nguyen
(74) *Attorney, Agent, or Firm*—Stoel Rives LLP

(57) ABSTRACT

A door has a core that includes a porous layer having a thickness and two opposing major surfaces. In one construction, the core also includes three fire-retardant layers, and two of the fire-retardant layers are separated by the porous layer. The porous layer and the fire-retardant layers are coupled together. Other constructions include one or more fire-retardant layers in balanced or unbalanced placement around the porous layer.

17 Claims, 6 Drawing Sheets

U.S. PATENT DOCUMENTS

| | | |
|---|---|---|
| 2,385,352 A | 9/1945 | Oliver |
| 2,682,083 A | 6/1954 | Patton |
| 2,797,450 A | 7/1957 | Ropella |
| 2,831,793 A | 4/1958 | Elmendorf |
| 2,859,187 A | 4/1958 | Ropella |
| 3,098,781 A | 7/1963 | Greten |
| 3,121,263 A | 2/1964 | Binner |
| 3,212,948 A | 10/1965 | McMahon |
| 3,287,855 A | 11/1966 | Hallonquist et al. |
| 3,308,013 A | 3/1967 | Bryant |
| 3,484,994 A | 12/1969 | Ashby et al. |
| 3,512,304 A | 5/1970 | Meuret |
| 3,533,190 A | 10/1970 | Hilfinger et al. |
| 3,546,841 A | 12/1970 | Smith et al. |
| 3,576,092 A | 4/1971 | Halpern |
| 3,616,120 A | 10/1971 | Warwick |
| D222,775 S | 12/1971 | Sartori |
| 3,639,200 A | 2/1972 | Elmendorf et al. |
| 3,760,543 A | 9/1973 | McAllister |
| 3,793,125 A | 2/1974 | Kunz |
| 3,796,586 A | 3/1974 | Hanlon et al. |
| 3,815,657 A | 6/1974 | Malek et al. |
| 3,871,409 A | 3/1975 | Gilbu |
| 3,899,860 A | 8/1975 | Newell |
| 3,987,599 A | 10/1976 | Hines |
| D244,736 S | 6/1977 | Palka |
| D245,824 S | 9/1977 | Palka |
| 4,091,142 A | 5/1978 | Elmore et al. |
| 4,104,828 A | 8/1978 | Naslund et al. |
| 4,125,664 A | 11/1978 | Giesemann |
| 4,132,042 A | 1/1979 | Di Maio |
| 4,142,007 A | 2/1979 | Lampe et al. |
| 4,146,662 A | 3/1979 | Eggers et al. |
| 4,183,187 A | 1/1980 | Simard |
| 4,229,497 A | 10/1980 | Piazza |
| 4,232,494 A | 11/1980 | Bauch et al. |
| 4,236,365 A | 12/1980 | Wheeler |
| 4,246,310 A | 1/1981 | Hunt et al. |
| 4,248,163 A | 2/1981 | Caughey et al. |
| 4,251,428 A | 2/1981 | Recker et al. |
| 4,252,767 A | 2/1981 | Piazza et al. |
| 4,268,565 A | 5/1981 | Luck et al. |
| 4,277,428 A | 7/1981 | Luck et al. |
| 4,336,180 A | 6/1982 | Recker et al. |
| 4,343,639 A | 8/1982 | Muschelknautz et al. |
| D266,042 S | 9/1982 | Moore et al. |
| D266,720 S | 11/1982 | Moore et al. |
| 4,361,612 A | 11/1982 | Shaner et al. |
| 4,364,984 A | 12/1982 | Wentworth |
| 4,403,064 A | 9/1983 | Heine |
| 4,405,752 A | 9/1983 | Recker et al. |
| 4,414,173 A | 11/1983 | Cobbledick et al. |
| 4,441,296 A | 4/1984 | Grabendike et al. |
| D274,107 S | 6/1984 | Gordon |
| 4,456,707 A | 6/1984 | Hille et al. |
| D274,944 S | 7/1984 | Coppa |
| 4,463,043 A | 7/1984 | Reeves et al. |
| 4,489,121 A | 12/1984 | Luckanuck |
| 4,494,970 A | 1/1985 | Muschelknautz et al. |
| 4,503,115 A * | 3/1985 | Hemels et al. ............... 442/161 |
| 4,544,440 A | 10/1985 | Wheeler |
| 4,550,540 A | 11/1985 | Thorn |
| 4,552,797 A | 11/1985 | Munk |
| D282,426 S | 2/1986 | Heimberger et al. |
| 4,579,613 A | 4/1986 | Belanger |
| 4,610,900 A | 9/1986 | Nishibori |
| 4,610,913 A | 9/1986 | Barnes |
| D286,177 S | 10/1986 | Case et al. |
| 4,622,190 A | 11/1986 | Schultz |
| 4,643,787 A | 2/1987 | Goodman |
| 4,685,266 A | 8/1987 | Mullet |
| D292,766 S | 11/1987 | Palka |
| 4,706,431 A | 11/1987 | Corvese |
| 4,720,363 A | 1/1988 | Mayumi et al. |
| 4,720,951 A | 1/1988 | Thorn et al. |
| 4,726,701 A | 2/1988 | Thomas |
| 4,779,325 A | 10/1988 | Mullet |
| 4,801,483 A | 1/1989 | Beckerman et al. |
| 4,811,538 A | 3/1989 | Lehnert |
| 4,830,929 A | 5/1989 | Ikeda et al. |
| 4,850,168 A | 7/1989 | Thorn |
| 4,853,062 A | 8/1989 | Gartland |
| 4,876,838 A | 10/1989 | Hagemeyer |
| D304,983 S | 12/1989 | Palka |
| 4,896,471 A | 1/1990 | Turner |
| 4,897,975 A | 2/1990 | Artwick et al. |
| 4,901,493 A | 2/1990 | Thorn |
| 4,908,990 A | 3/1990 | Yoon et al. |
| 4,914,844 A | 4/1990 | Seery |
| 4,942,084 A | 7/1990 | Prince |
| D311,957 S | 11/1990 | Hall |
| D314,242 S | 1/1991 | Mikolaitis |
| D314,625 S | 2/1991 | Hall |
| 5,016,414 A | 5/1991 | Wang |
| 5,020,292 A | 6/1991 | Strom et al. |
| D319,884 S | 9/1991 | Hall |
| 5,058,345 A | 10/1991 | Martinez |
| 5,074,087 A * | 12/1991 | Green ........................ 52/309.9 |
| 5,074,092 A | 12/1991 | Norlander |
| 5,075,059 A | 12/1991 | Green |
| 5,077,948 A | 1/1992 | Olson et al. |
| 5,084,353 A | 1/1992 | Cobbledick et al. |
| 5,102,710 A | 4/1992 | Kaufman et al. |
| 5,139,845 A | 8/1992 | Beckerman et al. |
| 5,142,835 A | 9/1992 | Mrocca |
| 5,161,346 A | 11/1992 | Olson et al. |
| 5,167,105 A | 12/1992 | Isban et al. |
| 5,177,868 A | 1/1993 | Kyle et al. |
| D335,982 S | 6/1993 | Brandon |
| 5,219,629 A | 6/1993 | Sobolev |
| 5,219,634 A | 6/1993 | Aufderhaar |
| D338,718 S | 8/1993 | Izzo |
| 5,239,799 A | 8/1993 | Bies et al. |
| 5,262,217 A | 11/1993 | Blaauw |
| 5,293,726 A | 3/1994 | Schick |
| D349,352 S | 8/1994 | Csati |
| 5,344,700 A | 9/1994 | McGath et al. |
| 5,355,654 A | 10/1994 | Stanley |
| 5,369,869 A | 12/1994 | Bies et al. |
| 5,397,406 A | 3/1995 | Vaders |
| 5,401,556 A | 3/1995 | Ishitoya et al. |
| 5,417,024 A | 5/1995 | San Paolo |
| 5,443,891 A | 8/1995 | Bach |
| 5,468,432 A | 11/1995 | Hurley et al. |
| 5,470,631 A * | 11/1995 | Lindquist et al. ............ 428/105 |
| D366,939 S | 2/1996 | Schafernak |
| D367,121 S | 2/1996 | Schafernak |
| 5,498,462 A | 3/1996 | Darfler |
| D370,269 S | 5/1996 | Schafernak |
| 5,522,195 A | 6/1996 | Minke et al. |
| D371,852 S | 7/1996 | Schafernak |
| 5,536,465 A | 7/1996 | Lesko |
| 5,537,789 A | 7/1996 | Minke et al. |
| 5,538,786 A | 7/1996 | Hurley et al. |
| 5,543,234 A | 8/1996 | Lynch et al. |
| 5,558,707 A | 9/1996 | Bernt et al. |
| 5,560,168 A | 10/1996 | Gagne et al. |
| D375,424 S | 11/1996 | Burwick |
| 5,614,581 A | 3/1997 | Cobbledick et al. |
| 5,634,508 A | 6/1997 | Herbst |
| D382,350 S | 8/1997 | Lynch |
| 5,681,513 A | 10/1997 | Farley |
| 5,687,513 A | 11/1997 | Baloga et al. |
| D388,196 S | 12/1997 | Schafernak et al. |

| | | | | | | |
|---|---|---|---|---|---|---|
| 5,705,008 A | 1/1998 | Hecht | | 6,487,824 B1 | 12/2002 | West et al. |
| 5,735,098 A | 4/1998 | Kanai et al. | | 6,503,425 B1 | 1/2003 | Thorbjornsson et al. |
| 5,743,056 A | 4/1998 | Balla-Goddard et al. | | 6,527,849 B2 | 3/2003 | Dry |
| 5,760,098 A | 6/1998 | Haas et al. | | 6,531,010 B2 | 3/2003 | Puppin |
| 5,766,774 A | 6/1998 | Lynch et al. | | 6,544,624 B1 | 4/2003 | Lopez-Anido et al. |
| 5,782,055 A | 7/1998 | Crittenden | | 6,550,204 B1 | 4/2003 | Herrera et al. |
| 5,792,552 A | 8/1998 | Langkamp et al. | | 6,558,603 B2 | 5/2003 | Wobbe et al. |
| 5,794,402 A | 8/1998 | Dumlao et al. | | 6,574,935 B2 | 6/2003 | Chen |
| 5,816,017 A | 10/1998 | Hunt et al. | | 6,604,334 B2 | 8/2003 | Rochman |
| 5,829,218 A | 11/1998 | Murray et al. | | 6,605,329 B2 | 8/2003 | Bulters et al. |
| 5,852,910 A | 12/1998 | Zebedee | | 6,619,005 B1 | 9/2003 | Chen |
| 5,858,416 A | 1/1999 | Sochtig et al. | | 6,619,010 B2 | 9/2003 | Chen |
| 5,869,184 A | 2/1999 | Oishi et al. | | 6,665,997 B2 | 12/2003 | Chen |
| 5,887,402 A | 3/1999 | Ruggie et al. | | 6,694,701 B2 | 2/2004 | Wang et al. |
| 5,900,463 A | 5/1999 | Tanimoto et al. | | 6,696,160 B2 | 2/2004 | Partusch et al. |
| RE36,240 E | 6/1999 | Minke et al. | | 6,698,257 B2 | 3/2004 | Kulas |
| D411,022 S | 6/1999 | Schafernak et al. | | 6,729,094 B1 | 5/2004 | Spencer et al. |
| 5,916,077 A | 6/1999 | Tang | | 6,740,279 B2 | 5/2004 | West et al. |
| 5,936,861 A | 8/1999 | Jang et al. | | 6,753,361 B2 | 6/2004 | Kroner et al. |
| 5,941,032 A | 8/1999 | Lydon, Jr. | | 6,756,439 B2 | 6/2004 | Chang |
| 5,943,824 A | 8/1999 | Tatara | | 6,826,881 B2 | 12/2004 | McGregor |
| 5,950,382 A | 9/1999 | Martino | | 6,855,283 B2 | 2/2005 | Hilligoss |
| 5,971,732 A | 10/1999 | Grisch et al. | | 6,887,911 B2 | 5/2005 | Shidaker et al. |
| 5,976,670 A | 11/1999 | Fugazzi | | 6,889,835 B2 | 5/2005 | Land |
| 5,983,676 A | 11/1999 | Brown | | 6,952,903 B2 | 10/2005 | West et al. |
| 5,987,843 A | 11/1999 | Canfield | | 6,962,031 B2 | 11/2005 | Clarke et al. |
| 6,024,908 A | 2/2000 | Koncelik | | 7,001,016 B2 | 2/2006 | Baxter et al. |
| 6,027,678 A | 2/2000 | Rehm et al. | | 7,108,914 B2 | 9/2006 | Skipor et al. |
| 6,034,155 A | 3/2000 | Espeland et al. | | 7,137,232 B2 | 11/2006 | Lynch et al. |
| 6,048,593 A | 4/2000 | Espeland et al. | | 7,178,308 B2 | 2/2007 | Fagan et al. |
| 6,067,699 A | 5/2000 | Jackson | | 7,185,468 B2 * | 3/2007 | Clark et al. .................. 52/455 |
| D426,645 S | 6/2000 | Bonomo et al. | | 7,284,352 B2 | 10/2007 | Lynch et al. |
| 6,070,377 A | 6/2000 | Guzman | | 7,337,544 B2 | 3/2008 | Fagan et al. |
| 6,073,419 A | 6/2000 | Moyes | | 7,370,454 B2 | 5/2008 | Lynch et al. |
| 6,081,955 A | 7/2000 | Dumlao et al. | | 2001/0001356 A1 | 5/2001 | West et al. |
| 6,092,343 A | 7/2000 | West et al. | | 2001/0026862 A1 | 10/2001 | Smith et al. |
| 6,112,496 A | 9/2000 | Hugus et al. | | 2001/0048170 A1 | 12/2001 | Wobbe et al. |
| 6,136,239 A | 10/2000 | Lundgren et al. | | 2001/0049405 A1 | 12/2001 | Porter |
| 6,151,743 A | 11/2000 | Church et al. | | 2001/0050032 A1 | 12/2001 | Dry |
| 6,151,849 A | 11/2000 | Twigg et al. | | 2002/0015846 A1 | 2/2002 | Evans et al. |
| 6,158,811 A | 12/2000 | Lammeck et al. | | 2002/0025424 A1 | 2/2002 | Bulters et al. |
| 6,183,824 B1 | 2/2001 | Padmanabhan et al. | | 2002/0038684 A1 | 4/2002 | Puppin |
| 6,197,242 B1 | 3/2001 | Parks et al. | | 2002/0041954 A1 | 4/2002 | Henrichs et al. |
| 6,200,687 B1 | 3/2001 | Smith et al. | | 2002/0061967 A1 | 5/2002 | White, III et al. |
| 6,206,309 B1 | 3/2001 | Danielsson et al. | | 2002/0069600 A1 | 6/2002 | Bryant |
| 6,207,077 B1 | 3/2001 | Burnell-Jones | | 2002/0091218 A1 | 7/2002 | Ford et al. |
| 6,211,269 B1 | 4/2001 | Pischtschan et al. | | 2002/0108337 A1 | 8/2002 | Clarke et al. |
| 6,247,280 B1 | 6/2001 | Grinshpun et al. | | 2002/0130439 A1 | 9/2002 | Kroner et al. |
| 6,271,156 B1 * | 8/2001 | Gleason et al. ............. 442/413 | | 2002/0160204 A1 | 10/2002 | Partusch et al. |
| 6,295,779 B1 | 10/2001 | Canfield | | 2002/0184849 A1 | 12/2002 | Chen |
| 6,308,465 B1 | 10/2001 | Galloway et al. | | 2002/0195742 A1 | 12/2002 | Beck et al. |
| 6,309,503 B1 * | 10/2001 | Martino ...................... 156/277 | | 2003/0005645 A1 | 1/2003 | Chen |
| 6,309,732 B1 | 10/2001 | Lopez-Anido et al. | | 2003/0015122 A1 | 1/2003 | Moriarty et al. |
| 6,314,704 B1 | 11/2001 | Bryant | | 2003/0126814 A1 | 7/2003 | Cook et al. |
| 6,340,389 B1 | 1/2002 | Klus | | 2003/0134970 A1 | 7/2003 | Crumley et al. |
| 6,358,593 B1 | 3/2002 | Bennett et al. | | 2003/0175488 A1 | 9/2003 | Asthana et al. |
| 6,358,614 B1 | 3/2002 | Porter | | 2003/0200714 A1 | 10/2003 | Minke et al. |
| 6,376,072 B1 | 4/2002 | Evans et al. | | 2003/0200721 A1 | 10/2003 | Gleeson et al. |
| 6,378,266 B1 | 4/2002 | Ellingson | | 2004/0003559 A1 | 1/2004 | Minke et al. |
| 6,393,779 B1 | 5/2002 | Boldt | | 2004/0009338 A1 | 1/2004 | Jo et al. |
| 6,401,414 B1 | 6/2002 | Steel et al. | | 2004/0018350 A1 | 1/2004 | Hilligoss |
| 6,401,983 B1 | 6/2002 | McDonald et al. | | 2004/0067353 A1 | 4/2004 | Miller et al. |
| 6,434,898 B1 | 8/2002 | Ward et al. | | 2004/0135280 A1 | 7/2004 | O'Nien et al. |
| 6,434,899 B1 | 8/2002 | Fortin | | 2004/0172906 A1 | 9/2004 | Ballantyne |
| 6,448,307 B1 | 9/2002 | Medoff et al. | | 2005/0028465 A1 | 2/2005 | Horsfall et al. |
| 6,449,790 B1 | 9/2002 | Szekely | | 2006/0053744 A1 | 3/2006 | Thompson et al. |
| 6,461,676 B2 * | 10/2002 | Martino ...................... 427/262 | | 2006/0096240 A1 | 5/2006 | Fortin |
| 6,467,118 B2 | 10/2002 | Dumlao et al. | | 2007/0204546 A1 | 9/2007 | Lynch et al. |
| 6,471,897 B1 | 10/2002 | Walsh et al. | | | | |
| 6,472,449 B1 | 10/2002 | Heinemann et al. | | FOREIGN PATENT DOCUMENTS | | |
| 6,475,615 B2 | 11/2002 | Porter | | | | |
| 6,476,091 B2 | 11/2002 | White, III et al. | | CA | 57271 | 10/1986 |
| 6,485,800 B1 | 11/2002 | Liittschwager et al. | | CN | 1432593 A | 7/2003 |

| | | | |
|---|---|---|---|
| DE | 1659856 A | 11/1969 | |
| DE | 3801486 A1 | 8/1989 | |
| DE | 10005927 A1 | 8/2001 | |
| DE | 20213474 U | 10/2002 | |
| DE | 19539179 A1 | 4/2007 | |
| EP | 0010714 A1 | 10/1979 | |
| EP | 0049299 B1 | 4/1982 | |
| EP | 0103048 A2 | 3/1984 | |
| EP | 0192518 A1 | 1/1986 | |
| EP | 0225629 B2 | 6/1987 | |
| EP | 0346640 A1 | 12/1989 | |
| EP | 0688639 A3 | 3/1996 | |
| EP | 0867573 A2 | 9/1998 | |
| EP | 1 170 456 A1 | 9/2002 | |
| EP | 1170456 A1 | 9/2002 | |
| EP | 0995667 B1 | 11/2002 | |
| EP | 1 529 919 A1 | 5/2005 | |
| EP | 1529919 A1 | 5/2005 | |
| EP | 1746242 A2 | 1/2007 | |
| EP | 1170456 A1 | 9/2009 | |
| FR | 2416332 A | 8/1979 | |
| GB | 1073932 | 6/1967 | |
| GB | 1405112 A | 9/1975 | |
| GB | 1420244 | 1/1976 | |
| GB | 1487309 | 9/1977 | |
| GB | 2044316 A | 10/1980 | |
| GB | 2215638 A | 9/1989 | |
| GB | 2261898 A | 6/1993 | |
| GB | 2294281 A | 4/1996 | |
| GB | 2308400 A | 6/1997 | |
| GB | 2418698 A | 4/2006 | |
| JP | 09256746 A | 9/1997 | |
| JP | 10238236 | 9/1998 | |
| JP | 11318598 | 11/1999 | |
| RU | USSR854737 | 5/1979 | |
| RU | USSR954398 | 4/1981 | |
| RU | 2051033 C1 | 12/1995 | |
| RU | 2123014 C1 | 12/1998 | |
| RU | 2040403 C1 | 11/1999 | |
| RU | 2142039 C1 | 11/1999 | |
| SE | 339745 B | 10/1971 | |
| WO | WO0136182 | 5/2001 | |
| WO | WO2007/05000 A1 | 5/2007 | |
| WO | WO 2007/098241 A2 | 8/2007 | |

OTHER PUBLICATIONS

"Factory-Fitted Douglas Fir Entrance Doors," U. S. Department of Commerce, Commercial Standard CS91-41, Feb. 10, 1941.
Douglas Fir Doors, E. A. Nord Company, Specifications of Pacific Northwest Fir Doors, 3 pages, 1953.
Mercer, Henry C., Sc D., "Ancient Carpenter's Tools," The Bucks County Historical Society, Doylestown, PA, p. 131-133, 1960.
Architectural Woodwork Quality Standards, Guide Specifications and Quality Certification Program, Fifth Edition, The Architectural Woodwork Institute, p. 109.
Lloyd, William B., Millwork Principles and Practices, Manufacture-Distribution-Use, Cahners Publishing Company, Inc., Chicago, IL., in association with The National Woodwork Manufacturers Association, Inc., Copyright 1966.
Feirer, John L., Cabinetmaking and Millwork, Chas A. Bennett Co., Inc., Peoria, IL., pp. 4,8-14, 145-146, 596-597, 684-687, copyright 1967. 1970.
A recorded voluntary standard of the trade published by the U.S. Dept. of Commerce, Commercial Standard CS 73-61, Old Growth Douglas Fir, Sitka Spruce and Western Hemlock Door.
1981 Sweet Catalogue, Section 8-3/50, p. 7.
Hechinger Brochure-dated Mar. 16, 1986.
Masonite Brand Door Facings- brochure, published in 1987.
Elite Doors- brochure, apparently published in Oct. 1987.
Quality Doors Brochure copyright 1988.

"The New Mission Series" product brochure by Nord, Part of the Jeld-Wen family, 300 W. Marine View Drive, Everett, WA 98201-1030, in existence at least as of Oct. 29, 2002.
1981 Sweet's Catalogue, Section 9.31/MO, p. 3, door in center of page.
Visador Brochure, date unknown.
http://web.archive.org/web/2007061605442/http://www.dzImgm.com/english/cpzs_dh1.htm Archived by http://www.archive.org/index.phpon Jun. 16, 2007 (archived version currently not available). Acknowledge as commercially available in application.
Thermatru Doors, Product Manual, issued: Dec. 2000.
Abstract of JP11318598, Nov. 24, 1999, Matsushita Electric Inc. Co. Ltd.
Abstract of JP10238236, Sep. 08, 1998, Okura Industrial Co. Ltd.
Door Test Background by Aquafire Systems entitled Aquafire Systems Intumescent Fire Protection Coatings for Timber, web pages printed Oct. 13, 2008 http://www.aquafire.co.uk/hmo_doors_test_background_m.htm.
http://web.archive.org/web/20040611221137/http://www.aquafire.co.uk/protection_of_doors_from_fire_in_hmos.htm Jun. 2004 archived version of <http://www.aquafire.co.uk/protection_of_doors_from_fire_in_hmos.htm> discloses the use of intumescent paint on a wooden door.
Modern Plastics; Harper, Charles A. Modern Plastics Handbook, McGraw-Hill. (pp. 2.1-2.88), 2000 Online version available at: http://www.knovel.com/knovel2/Toc.jsp?BookID=10088&VerticalID=0 Imported as modern_plastics_handbook_2.pdf.
Modern Plastics; Harper, Charles. A. Modern Plastics Handbook, McGraw-Hill. (pp. 4.1-4.69), 2000 Online version available at: http://www.knovel.com/knovel2/Toc.jsp?BookID=1008&VerticalID=0 Imported as modern_plastics_handbook_4.pdf.
Abstract of JP11318598, Nov. 24, 1999, Matsushita Electric Inc. Co. Ltd.
Abstract of JP10238236, Sep. 8, 1998, Okura Industrial Co. Ltd.
PCT International Search and Written Opinion, completed Jul. 5, 2008, mailed Jul. 14, 2008 PCT/US08/54298, International Filing date Feb. 19, 2008, JELD-WEN, inc.
Chemical Encyclopedia, vol. 1, ABL-DAR, The Large Russian Encyclopedia, p. 197.
Bayer RIM Molding: Advanced RIM Technologies, Printed Jan. 29, 2004.
Jeld-Wen Windows and Doors, Premium Fiberglass Door Offering, 6'8" Premium Fiberglass Door Design, date unknown.
Applied Composites Corp., web page available at http://www.appliedcompositescorp.com, as available via the Internet and printed Feb. 18, 2004.
Bayer RIM Molding, Long Fiber Technology (LFT), web page at http:/www.rimmolding.com/composites/tech_longfibert.html, as available via the Internet and printed Mar. 1, 2004.
EFW Inc., web page available at http://www.efw.com, as available via the Internet and printed Feb. 18, 2004.
Fibertech Industries, Inc., Replacement Fiberglass and Kevlar Jeep Bodies and Parts, web page available at http://www.fibertechind.com, as available via the Internet and printed Feb. 18, 2004.
Masonite International Builder's Section, Masonite's Full Line Catalog, web page available at http://www.masonite.com/PRODUCT_GUIDE/Barrington_doors.asp, as available via the Internet and printed Feb. 18, 2004.
Miklos, M. et al., Injection Molding Troubleshooter, Plastics Technology, Common Mistakes in Long-Fiber Molding, web page at http://www.plasticstechnology.com/articles/200301ts1.html.as available via the Internet and printed Mar. 1, 2004.
Plaspros Inc., Welcome to Plaspro Inc. Online, web page available at http://www.plaspros.com, as available via the Internet and printed Feb. 18, 2004.
Patent Cooperation Treaty, International Search Report, International Application No. PCT/US2005/014339, mailed Jul. 27, 2005, 4 pages.
Symosko, G. et al., "High Density Structural RIM Composites for Large Part Applications." Composites 2003 Convention and Trade Show, Composites Fabricators Association, Oct. 1-3, 2003, Anaheim, California.
Premdor, Construction of Premdor Doors, Flush Hollow-Core Series, Premdor Reference Guide, 1998, pp. 27-28.

What's New in Entry Doors: Manufacturers and Suppliers Offer a Variety of New Ways to Enhance Aesthetics and Performance, Window and Door, Aug. 2000, pp. 75-76.

Raised Panel Interior Doors by Premdor, Jun. 2000.

Schut, J.H., "Wood is Good for Compounding, Sheet and Profile." Plastics Technology Online Article, web page at http://www.webclipping.com/cgi-bin/hl.cgi"a=2925&c=10473&t-3, as available via the Internet and printed Feb. 13, 2001.

Fiberglass Non-Textured Entry Systems, Masonite International Corporation, Big Builder, May 2003.

Grand Passage Fiberglass Entrances by Georgia Pacific, 1994.

You Won't See G-P Products in the New American Home. Georgia-Pacific, 1994.

The Finest Material, Dixie Pacific Manufacturing Company, 1996.

Products, Open Design's Door, Professional Builder, Jun. 1994, p. 127.

Blomberg Window Systems, 2000.

ABTCO, The Ultimate Source for Next-Generation Building Products, ABT Building Products Corporation, 1996.

Hardboard Siding and Accessories, Pro-1 Hardboard Siding, web page at http://www.abtco.com/Harprod.htm, as available via the Internet and printed Jun. 17, 2000.

American/Cameo, Profiles, web page at http://www.abtco.com/AmerCam2.htm, as available via the Internet and printed Jun. 17, 2000.

Lifetime Doors, Inc., Welcome to Lifetime Doors, web page at wysiwyg://29/http://www.lifetimedoors.com/Lifetime2.htm, as available via the Internet and printed Jan. 2, 2001.

Windows and Patio Doors, Lincoln Windows, Brochure, 2000, 57 pages.

Sliding Patio Doors, web page at http://www.lincolnwindows.com/sidoor.htm, as available via the Internet and printed Jan. 18, 2001.

Wood Interior-Vinyl Exterior, Lincoln W-V Series, Lincoln Windows, 2000.

Home Improvement Products by Pacesetter Corporation, web page at http://www.pacesettercorp.com/whatsnew, as available via the Internet and printed Jan. 17, 2001.

Tucker Millworks, "Climate Seal" Product Line, web page at http://www.tuckermillworks.com/csealintro.htm, as available via the Internet and printed Jan. 24, 2001.

Smooth-Star Raised-Panel Fiberglass Doors, Therma Tru Doors, 2000.

Outswing French Door, "Are You Prepared for the Possibilities?" Web page at http://www.marvin.com/showroom/bodies.

Marvin Windows and Doors, Made for You, 2000.

Quite Possibly the Ultimate Building Material., Milgard Windows, web page at www.milgard.com, as available via the Internet, 2001.

Milgard WoodClad Windows and Doors, Milgard Windows, 1998.

"A window is just a window...unless it's a Milgard Window." Milgard Windows, Jun. 2003.

Pease Helpline Page, web page available at http://www.peasedoors.com/Pease_Helpline/helpline.htm, as available via the Internet and printed May 11, 2001.

Fiberglass Entry Systems, Timberline: A New Generation of Beauty, Mar. 2002.

How to Measure, Entry Doors, Door Comparison, we page at http://www.stanleyworks.com/productgroups/doors/comparisons.asp, as available via the Internet and printed Apr. 11, 2002.

Intro 2, Entry Doors, Stanley's Commitment to Quality and Value, web page at http://www.stanleyworks.com/ productgroups/doors/doors.asp, as available via the Internet and printed Apr. 11, 2002.

Therma-Tru Doors, Homeowners, web page at http://www.thermatru.com/homeowner/index.html, as available via the Internet and printed Apr. 11, 2002.

"A Door for Every Home—Therma-Tru—Fiberglass and Steel Door Systems." Therma-Tru Doors, pp. 2-140, 1999.

Products and Services, Robert Bowden, Inc. Building Materials and Millwork, 2001.

What You've come to Expect from Milgard Windows, Building Products, Nov.-Dec. 2001.

"You have precisely one window in mind. Which is why we offer roughly 4,000,000 variations." Milgard Windows, Residential Architecture, May 2002.

Barnett Millworks Inc. introduces Mahogany Entry Door Systems, 2000.

Semco Windows and Doors. Web page available at www.semcowindows.com, as available via the Internet and printed Aug. 2000.

Knock on Wood, Pro Sales, Mar. 2002.

BASF Corporation Polyurethanes General Information, web page at http://www.basf.com/static/OpenMarket/Xcelerate/Preview_cid-974236926456_pubid-97, as available via the Internet and printed 10/12/21004.

Bayer Polymers Americas, "Bayer Polymers and Warner Industries LLC Give Standard Steel Garage Doors a Facelift." Web page at http://www.pu2pu.com/htdocs/customers/bayer/warner.htm, as available via the Internet and printed Sep. 20, 2004.

Suppliers Showcase, "Register at BIS 2004!" web page at http://www.buildingindustryshow.com/showcase.html, as available via the Internet and printed Sep. 20, 2004.

Composite Applications, Construction Industry, web page at http://www.appliedcompositecorp.com/const2.html, as available via the Internet and printed Feb. 3, 2004.

Core Molding Technologies, web page at http://www.coremt.com, as available via the Internet and printed Feb. 3, 2004.

\* cited by examiner

MULTI-LAYERED FIRE DOOR AND METHOD FOR MAKING THE SAME

NOTICE OF COPYRIGHT PROTECTION

This application is a continuation of U.S. patent application Ser. No. 10/284,392, entitled, "Multi-Layered Fire Door and Method for Making The Same," filed on Oct. 31, 2002, now U.S. Pat. No. 7,185,468, the priority benefit of which is claimed by this application and which is incorporated in its entirety herein by reference.

FIELD OF THE INVENTION

This invention relates to doors in general, and more particularly to a fire door having several fire-retardant layers.

BACKGROUND

Fire doors are designed and installed in an attempt to protect lives and property from fire, smoke, and heat by providing a barrier to withstand the fire, smoke, and heat for a period of time. To be labeled or certified as a fire door, a door must fulfill the requirements of certain codes or standards that regulate the construction and installation of such doors. These codes or standards include, among others, the Uniform Building Code (UBC), and codes promulgated by the National Fire Protection Association (NFPA), and American Society for Testing and Materials (ASTM).

Private testing laboratories, such as Underwriters' Laboratories and Warnock Hersey, may test for adherence to such codes or standards, and may test for additional attributes. The laboratories may also certify that a fire door meets fire protection requirements after conducting testing (such as destructive testing) of the door. Usually, this certification is expressed as a fire-rating offering a specific level of protection from fire, smoke, and/or heat for a limited amount of time. For example, a 20-minute fire-rated door should, if installed correctly, maintain its structural integrity and provide a barrier to fire, heat, and/or smoke for at least 20 minutes. So long as a door meets relevant fire protection requirements, its design may vary to fulfill other design considerations, such as weight, cost of manufacture, and aesthetic appearance.

An interior routed medium-density fiberboard (MDF) fire door meeting current fire protection requirements generally is constructed of a one-and-one-half inch thick sheet of MDF having a minimum density of approximately 42 pounds per cubic foot (pcf) and a one-eighth of an inch hardboard skin on both sides of the MDF. A single-swing wood fire door using MDF having this thickness and density, and that is three feet wide by eight feet high, weighs nearly 153 pounds. Not only is such a door extremely heavy, but manufacturing it can be costly and difficult as well.

For example, manufacturing a molded-panel fire door that meets current fire protection requirements generally requires using a mold. There are several ways known to prepare molds. One common method is to use matching castings or dies. A molded door generally has two exterior skins, and one mold is required for each skin. To make a custom-ordered door, a new mold must be created. While using molds to make a paneled door is generally less costly on a high-volume basis than machining reliefs into a door, molding custom-ordered doors can significantly add to the manufacturing expense—in some cases, this expense can become cost-prohibitive.

Manufacturing paneled wood doors without molds is known in the art. Such doors generally include two exterior skins with a core inserted between the skins. In one such conventional door, the core generally includes a three-eights-of-an-inch-thick layer of MDF, a three-eights-of-an-inch-thick layer of expanded polystyrene, and another three-eights-of-an-inch-thick layer of MDF. The layers of the core are adhered to one another, as are the external skins and the core. Wood side stiles and top and bottom rails are then adhered to an outer perimeter of the door. Panels are formed by routing a series of grooves into the external skins.

SUMMARY OF THE INVENTION

The present invention includes multi-layered fire doors and methods for making such doors. One embodiment of the present invention provides a fire door that includes a core. The core has a porous layer having a thickness and two opposing major surfaces. The core also has at least three, preferably fire-retardant, additional layers. Each of the three fire-retardant layers has a thickness and two opposing major surfaces. The porous layer and the at least three fire-retardant layers are coupled together. At least two of the at least three fire-retardant layers are separated by the porous layer from the other fire-retardant layers. The fire door can also include first and second exterior layers, each having a thickness and two opposed major surfaces. A grooved first pattern can be disposed on the first exterior layer and a grooved second pattern can be disposed on the second exterior layer.

The fire-retardant layers may be made of any suitable material. In one embodiment, the fire-retardant layers are made of MDF having a density of at least 42 pcf. Likewise, the porous layer can be made of any suitable material. One example is a thermoplastic polymer having a density of at least 1 pcf. The thickness of each of the fire-retardant layers is the same. The thickness of the porous layer is approximately the same as the thickness of each fire-retardant layer. The first and second exterior layers can include a hardboard having a density of approximately 52 pcf. The thicknesses of the first and second exterior layers are approximately the same.

Another embodiment of the present invention provides a fire door that includes a core with a porous layer having a thickness of approximately three-eighths of an inch and two opposing major surfaces. The core also has at least two, preferably fire-retardant, additional layers. Each of the two fire-retardant layers has a thickness of approximately nine-sixteenths of an inch and two opposing major surfaces. The porous layer and the at least two fire retardant layers are coupled together. The at least two fire-retardant layers are separated by the porous layer.

An embodiment of the present invention further provides for methods of making a door having a core with a porous layer and two opposing major surfaces and fire-retardant layers, each having a thickness and two opposing major surfaces. One embodiment of a method according to the present invention includes coupling together a porous layer and at least three fire-retardant layers. At least two of the fire-retardant layers are separated by the porous layer. The door can also include first and second exterior layers each having a thickness and two opposed major surfaces. In one embodiment, the method according to the present invention also includes forming a blank by coupling the first and second exterior layers to the core. An embodiment further includes applying a generally uniform pressure to the blank for a period of time. A further embodiment includes machining a grooved first pattern on the first exterior surface and machining a grooved second pattern on the second exterior surface.

An advantage of one embodiment of the present invention is to provide a fire-rated door that can endure a 20-minute fire test according to at least the following standards: UBC 7-2 (1997), Part I NFPA 252 (1999), UL 10C (1998), ASTM E 2072 (1999), and CAN4 S113 and WH-PN-014 (1985).

Another advantage of one embodiment of the present invention is to provide a lighter-weight fire-rated door, i.e., approximately 120 pounds (having dimensions of three feet by eight feet by one-and-three-quarters of an inch), than is currently available.

Yet another advantage of one embodiment of the present invention is to reduce the complexity and cost of manufacturing wood, paneled fire-rated doors by forming panels in the door by machining, instead of molding.

A further advantage of one embodiment of the present invention is to increase a fire door manufacturer's flexibility in manufacturing customer-ordered wood, paneled fire-rated doors by forming panels in the door by machining, rather than by molding.

Yet a further advantage of one embodiment of the present invention is to improve the insulative qualities, or R-value, of fire-rated doors.

An additional advantage of one embodiment of the present invention is to improve the sound dampening of fire-rated doors.

Yet another additional advantage of one embodiment of the present invention is to reduce a fire-rated door's susceptibility to warping caused by moisture.

Additional advantages of embodiments of the invention are set forth in the detailed description that follows and will become more apparent to those skilled in the art upon examination of the following.

BRIEF DESCRIPTION OF THE DRAWINGS

The accompanying drawings, which are incorporated herein and constitute part of this specification, help to illustrate embodiments of the invention. In the drawings, like numerals are used to indicate like elements throughout.

DETAILED DESCRIPTION

The present invention includes doors, parts of doors, and methods of making doors. One embodiment of the present invention includes a multilayer fire door and methods of making such a door.

Figure 1:
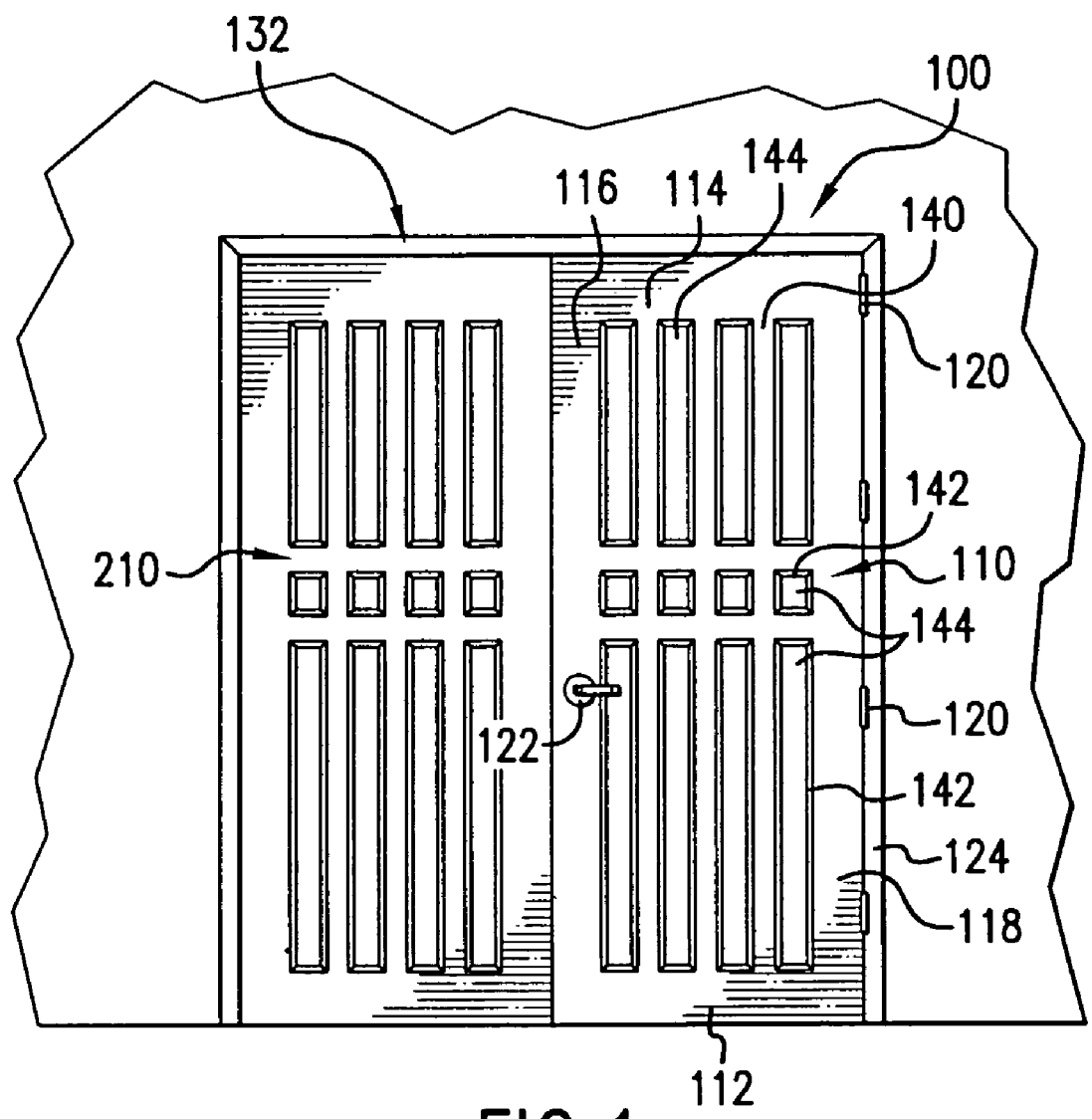
FIG. 1 is a front plan view of a double door system according to an embodiment of the invention.

FIG. 1 shows a front plan view of a door according to an embodiment of the invention. A standard-pair wood, paneled fire door 100 includes two separate but adjacent doors, 110 and 210. The door 100 can also be a single-swing door (not shown). As doors 110 and 210 are identical in material respect, only door 110 will be described in detail.

Door 110 has a major axis and a minor axis. The major axis extends vertically and the minor axis extends horizontally. The door 110 includes an outer peripheral frame including a bottom rail 112, a top rail 114, and a pair of side stiles 116 and 118. The top rail 114 and the bottom rail 112 extend horizontally along the minor axis and generally parallel to one another. The side stiles 116 and 118 extend vertically along the major axis and generally parallel to one another. The top rail 114 and the bottom rail 112 are generally perpendicular to the side stiles 116 and 118. The top rail 114 and the bottom rail 112 are made of MDF having a density of at least 42 pcf. The side stiles 116 and 118 are made of pine or fir, preferably, having a minimum specific gravity of 0.34. The side stiles 116 and 118 can be made of another type or kind of wood. Preferably, the specific gravity of that wood is a minimum of 0.34. Moreover, the rails 112 and 114, and the stiles 116 and 118 may be made of any suitable material.

The door 110 also includes hinges 120 to mount the door 110 to a hinge jamb 410 to allow the door 110 to swing open and closed. As shown in FIG. 1, there are four hinges 120 mounting the door 110 to the hinge jamb 124. The number of hinges 120 can vary to accommodate various design considerations, such as the weight of the door 110. A handle 122 is provided on the door 110 to operate a latch (not shown), which maintains the door 110 in a closed position. While door 210 can be opened and closed, the door 210 preferably is maintained in a closed position. The latch on door 110 maintains the door 110 in a closed position by engaging with a complementary recess (not shown) on door 210. A width and a height of the doors 110 and 210 can vary but, in general, should not exceed approximately three feet in width and eight feet in height.

In general, the above description of the door's features visible in FIG. 1 comprise conventional door construction. It is included here for completeness, and to aid one of ordinary skill in the art in constructing a door according to the present invention.

Figure 2:
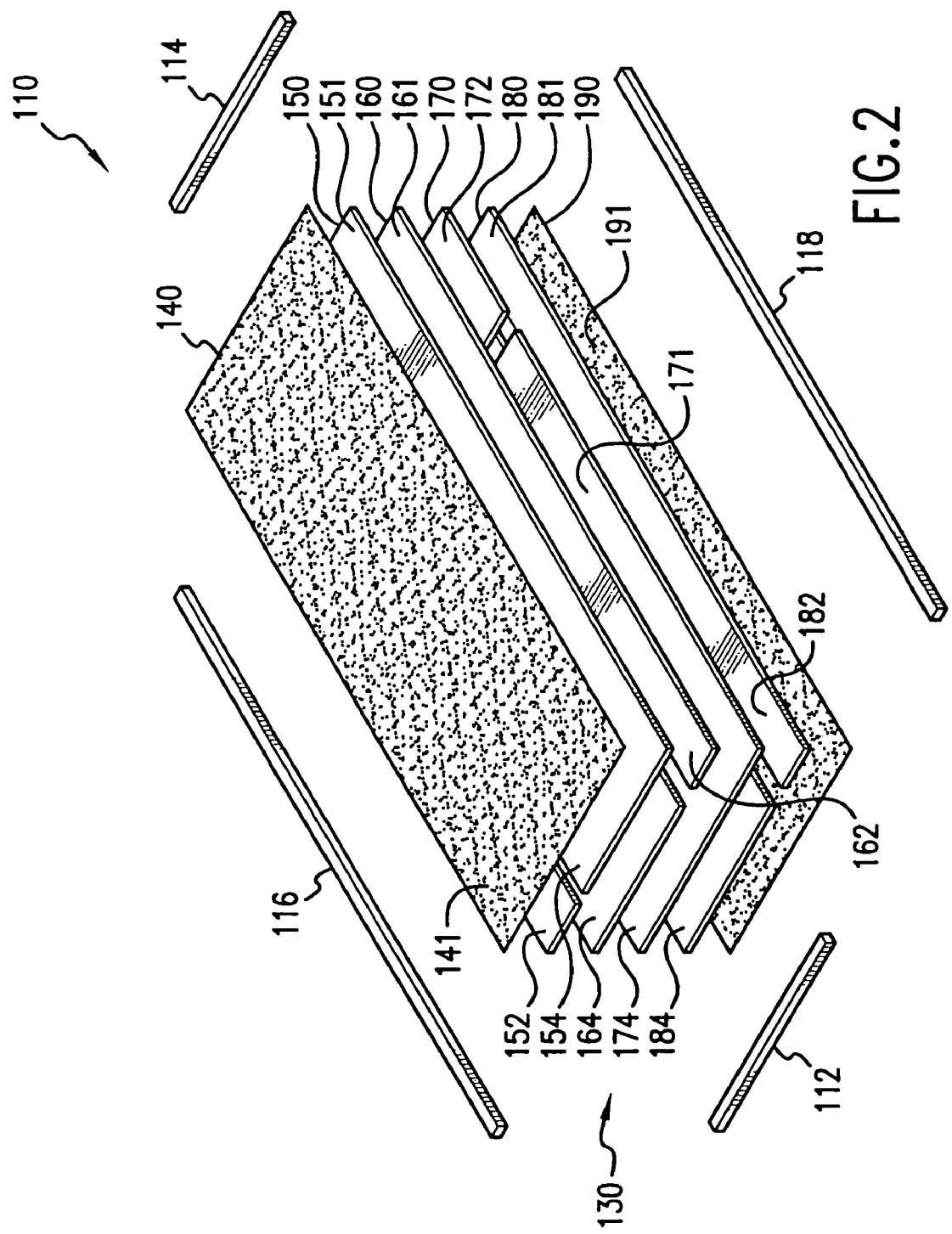
FIG. 2 is a partially-exploded orthogonal view of the door of FIG. 1 prior to machining panels.

Referring now to FIG. 2, the door 110 includes a core 130, which is disposed between a front face 140 and a rear face 190. The core 130 shown has several layers of material. The layers 150, 160, 170, 180 may be made of any suitable material. Preferably, at least three of the layers 150, 160, 180 are made of fire-retardant material. Preferably, the layers of fire-retardant material comprises MDF. Most preferably, the layers comprise MDF having a density of approximately 42 pcf. The core 130 includes a first fiberboard 150, a second fiberboard 160, and a third fiberboard 180. Disposed between the second and third fiberboards 160 and 180 is a layer of porous material 170. The porous layer 170 may be made of any suitable material. Preferably, the porous layer 170 is a foam sheet comprised of a thermoplastic polymer, such as expanded polystyrene, having a density of at least 1 pcf. Alternatively, the porous layer 170 can be a fire-retardant material.

Each of the front face 140, the rear face 190, the first fiberboard 150, the second fiberboard 160, the third fiberboard 180, and the porous layer 170 has two major surfaces and a thickness. A height and width of each of the front face 140, the rear face 190, the first fiberboard 150, the second fiberboard 160, the third fiberboard 180, and the porous layer 170 correspond generally to the height and width of the door 110.

An exemplary embodiment of such a door 110 comprises each of the front face 140, the rear face 190, the first fiberboard 150, the second fiberboard 160, the porous layer 170, and the third fiberboard 180 having dimensions of three feet wide by eight feet high. This exemplary embodiment also comprises the thickness of both the front face 140 and the rear face 190 being one-eighth-of-an-inch. In this exemplary embodiment the thickness of each of the first fiberboard 150, the second fiberboard 160, the porous layer 170, and the third fiberboard 180 is three-eighths-of-an-inch. Alternatively, any other suitable dimensions can be provided.

The front face 140 and the rear face 190 may be made of any suitable material. Preferably, the front face 140 and the rear face 190 are a hardboard made of wood fibers having a density of at least 52 pcf. The hardboard of the front face 140 and the rear face 190 can be made of any other suitable material, preferably, having a density of at least 52 pcf. The thicknesses of the front face 140 and the rear face 190 shown can be the same. The thickness of the front face 140 shown is one-eighth of an inch, as is the thickness of the rear face 190. Alternatively, these thicknesses can be approximately one-eighth of an inch or any other suitable thickness. The two major surfaces of the front face 140 include a front-facing surface 141 and a rear-facing surface (not shown). The front-facing surface 141 and the rear-facing surface of the front face 140 are disposed on opposing sides of the front face 140. Either the front-facing surface 141 or the rear-facing surface of the front face 140 can be disposed adjacent to one of the major surfaces of the first fiberboard 150. In the embodiment shown in FIG. 2, the rear-facing surface of the front face 140 is disposed adjacent to the first fiberboard 150.

The first fiberboard 150 can be formed by disposing a vertical splice 152 adjacent to a main sheet 154. Alternatively, the first fiberboard 150 can be a single sheet. The vertical splice 152 can be disposed proximate the side stile 116. The width of the vertical splice 152 can be any suitable dimension. For example, the width of the vertical splice 152 can be six inches. The width of both the vertical splice 152 and the main sheet 154 correspond generally to the width of the door 110. Thus, the maximum dimensions of the fiberboard 150 are three feet wide by eight feet high. The height of the vertical splice 152 is preferably the same as the height of the main sheet 154. Preferably, the dimensions of the side stiles 116 and 118 are one-and-one-quarter inches by one-and-one-half inches. Preferably, the dimensions of the bottom rail 112 and the top rail 114 is one-and-one-quarter inches by one-and-one-half inches by thirty-three-and-seven-eighths inches. Alternatively, any other suitable dimensions can be used.

The thickness of the first fiberboard 150 shown is three-eighths of an inch. Alternatively, the thickness can be approximately three-eights of an inch or any other suitable thickness. The two major surfaces of the first fiberboard 150 include a front-facing surface 151 and a rear-facing surface (not shown). The front-facing surface 151 and the rear-facing surface of the first fiberboard 150 are disposed on opposing sides of the first fiberboard 150. Either the front-facing surface 151 or the rear-facing surface of the first fiberboard 150 can be disposed adjacent to the rear-facing surface of the front face 140. According to the embodiment, the front-facing surface 151 of the first fiberboard 150 is disposed adjacent to the rear-facing surface of the front face 140. Thus, the rear-facing surface of the first fiberboard 150 is disposed adjacent to one of the major surfaces of the second fiberboard 160.

The second fiberboard 160 is formed by disposing a vertical 162 splice adjacent to a main sheet 164. Alternatively, the second fiberboard 160 can be a single sheet. The vertical splice 162 is disposed proximate the side stile 118. The width of the vertical splice 162 can be any suitable dimension. For example, the width of the vertical splice can be six inches. The width of both the vertical splice 162 and the main sheet 164 corresponds to the width of the door 110. Thus, the maximum dimensions of the fiberboard 160 are three feet wide by eight feet high. The height of the vertical splice 162 is the same as the height of the main sheet 164.

The thickness of the second fiberboard 160 is preferably three-eighths of an inch. It can be approximately three-eighths of an inch or another, selected thickness. The two major surfaces of the second fiberboard 160 include a front-facing surface 161 and a rear-facing surface (not shown). The front-facing surface 161 and the rear-facing surface of the second fiberboard 160 can be disposed on opposing sides of the second fiberboard 160. Either the front-facing surface 161 or the rear-facing surface of the second fiberboard 160 can be disposed adjacent to the rear-facing surface of the first fiberboard 150. According to the embodiment, the front-facing surface 161 of the second fiberboard 160 is disposed adjacent to the rear-facing surface of the first fiberboard 150. Thus, the rear-facing surface of the second fiberboard 160 is disposed adjacent to one of the major surfaces of the porous layer 170.

Preferably, the porous layer 170 is formed by disposing a horizontal splice 172 adjacent to a main sheet 174. Alternatively, the porous layer 170 can be a single sheet. The horizontal splice 172 is disposed proximate the top rail 114. Alternatively, the horizontal splice 172 is disposed proximate the bottom rail 112. The dimension of the horizontal splice 172 can be any suitable dimension. For example, the height of the splice 172 can be 16 inches. The height of both the horizontal splice 172 and the main sheet 174 correspond to the height of the door 110. Thus, the maximum dimensions of the porous layer 170 are three feet wide by eight feet high. The width of the horizontal splice 172 is the same as the width of the main sheet 174. The thickness of the porous layer 170 shown is three-eighths of an inch. In another embodiment, it is approximately three-eighths of an inch or another thickness.

The two major surfaces of the porous layer 170 include a front-facing surface 171 and a rear-facing surface (not shown). The front-facing surface 171 and the rear-facing surface of the porous layer 170 are disposed on opposing sides of the porous layer 170. Either the front-facing surface 171 or the rear-facing surface of the porous layer 170 can be disposed adjacent to the rear-facing surface of the second fiberboard 160. According to the embodiment, the front-facing surface 171 of the porous layer 170 is disposed adjacent to the second fiberboard 160. Thus, the rear-facing surface of the porous layer 170 is disposed adjacent to one of the major surfaces of the third fiberboard 180.

The third fiberboard 180 is formed by disposing a vertical splice 182 adjacent to a main sheet 184. Alternatively, the third fiberboard 180 can be a single sheet. The vertical splice 182 is disposed proximate the side stile 116. Alternatively, the vertical splice 182 can be disposed proximate the side stile 114. The width of the vertical splice 182 can be any suitable dimension. For example, the width of the vertical splice 182 can be approximately six inches. Preferably, the width of both the vertical splice 182 and the main sheet 184 corresponds to the width of the door 110. Thus, the maximum dimensions of the third fiberboard 180 are three feet wide by eight feet high. The height of the vertical splice 182 is the same as the height of the main sheet 184.

The thickness of the third fiberboard 180 is preferably three-eighths of an inch. Alternatively, the thickness can be approximately three-eights of an inch or another suitable thickness. The two major surfaces of the third fiberboard 180 include a front-facing surface 181 and a rear-facing surface (not shown). The front-facing surface 181 and the rear-facing surface of the third fiberboard 180 are disposed on opposing sides of the third fiberboard 180. Either the front-facing surface 181 or the rear facing surface of the third fiberboard 180 can be disposed adjacent to the rear-facing surface of the porous layer 170. According to the embodiment described herein, the front-facing surface 181 of the third fiberboard 180 is disposed adjacent to the rear-facing surface of the porous layer 170. Thus, the rear-facing surface of the third fiberboard is disposed adjacent to one of the major surfaces of the rear face 190.

As described above, the rear face 190 includes a hardboard preferably having a density of at least 52 pcf and the thickness is one-eighth of an inch. Alternatively, the thickness can be approximately one-eighth of an inch or another suitable thickness. The two major surfaces of the rear face 190 include a front-facing surface 191 and a rear-facing surface (not shown). The front-facing surface 191 and the rear-facing surface of the rear face 190 are disposed on opposing sides of the rear face 190. Either the front-facing surface 191 or the rear-facing surface of the rear face 190 can be disposed adjacent to the rear-facing surface of the third fiberboard 180. According to the embodiment, the front-facing surface 191 of the rear face 190 is disposed adjacent to the rear-facing surface of the third fiberboard 180.

To enhance the aesthetic appearance of the door 110, a series of grooves 142 are disposed in the front face 140 of the door 110 forming panels 144. Alternatively, the door 110 can be flush and have no panels. As shown in FIG. 1, one embodiment preferably includes twelve panels 144 formed in the front face 140 of the door 110. The number and shape of the panels 144 can vary depending on the design desired. As will be described in more detail below, the grooves 142 are formed by machining, such as routing, into the door 110. In the embodiment, the depth of the grooves 142 preferably are seven-sixteenths of an inch. Thus, the grooves 142 penetrate the entire thicknesses of the front face 140 and nearly the entire thickness of the first fiberboard 150. Although not shown, panels are preferably formed in the rear face 190. In general, the depth of the grooves in the panels formed in the rear face 190 preferably are the same as that of the front face 140, but alternatively, can be different than that of the front face. Thus, the grooves in the rear face 190 penetrate the entire thickness of the rear face 190 and nearly the entire thickness of the third fiberboard 180.

As described above, a conventional door made entirely of MDF weighs approximately 153 pounds. The weight of the door 110 according to the embodiment as described above is substantially less. Using a similarly dimensioned door, i.e., three feet wide and eight feet high, with the thicknesses described above, the door 110 according to the embodiment should weigh approximately 120 pounds. The weight of the door 110 is reduced further by the weight of the material removed by machining the grooves to form the panels in the door 110.

A method of making the door 110 according to an embodiment will be described next with reference to FIG. 3. As described above, the core 130 includes the first fiberboard 150, the second fiberboard 160, the third fiberboard 180, and the porous layer 170. The method includes coupling together the porous layer 170 and the first fiberboard 150, the second fiberboard 160, and the third fiberboard 180. Preferably, coupling refers to joining by adhering surfaces together with an adhesive, such as glue or cement, as described below. A variety of commercially available adhesives can be used, including, for example, Tightbond® 100 manufactured by Franklin International, RK-3490 manufactured by H. B. Fuller Co., and WD-1300C0-2F. manufactured by Specialty Polymers, Inc. Other suitable methods of joining surfaces together can be used.

In the embodiment shown in FIG. 2, two of the first fiberboard 150, the second fiberboard 160, and the third fiberboard 180 are separated by the porous layer 170. An embodiment of the method of making the core 130 of the door 110 is described in further detail below and in FIG. 4.

Figure 3:
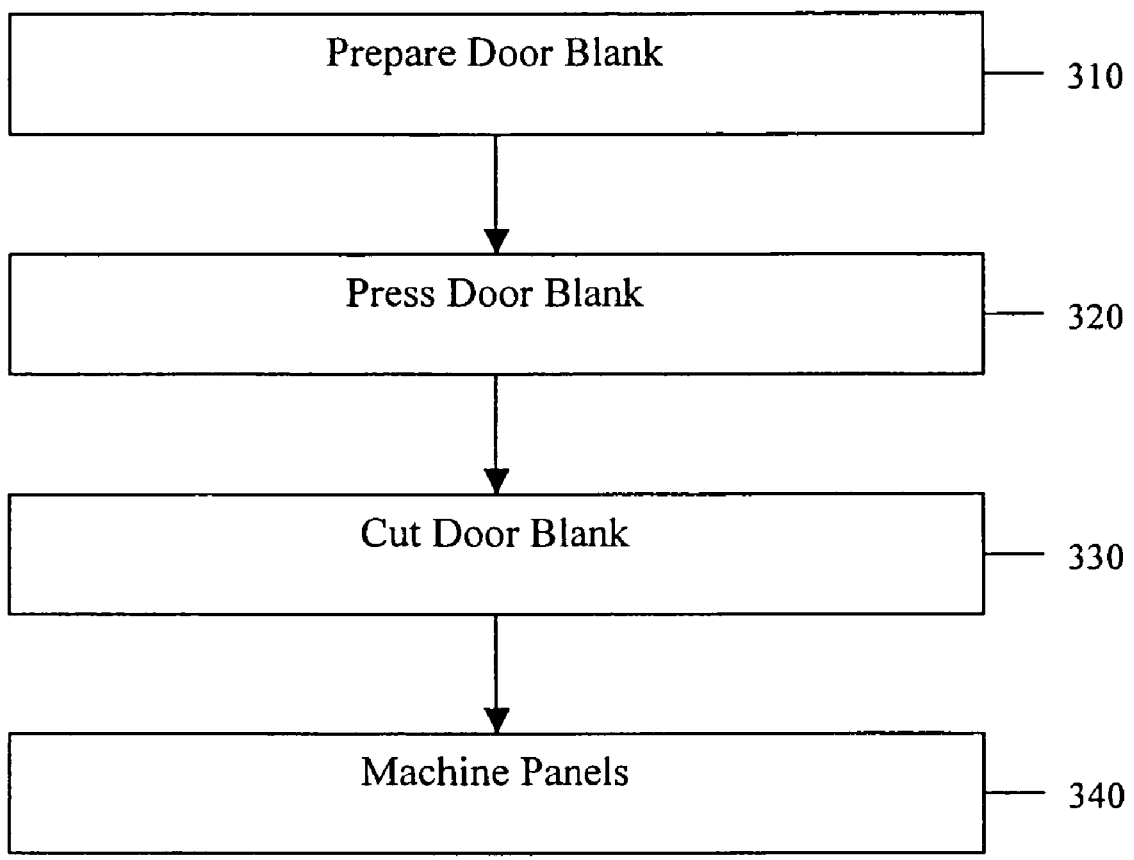
FIG. 3 is a flow diagram of a method of making the door of FIG. 1.

FIG. 3 is a flow chart diagram illustrating a method of making the door 110. A door blank (not shown) is first assembled as indicated by block 310. The rear face 190 can be placed on a flat surface, such as a lay-up table (not shown). Either the front-facing surface 191 or the rear-facing surface of the rear face 190 can be placed on the flat surface. According to the embodiment, the rear-facing surface of the rear face 190 is placed on the flat surface.

Preferably, an adhesive (not shown) is applied to at least one surface of each of the side stiles 116 and 118 and the bottom rail 112 and the top rail 114. As indicated by block 311 in FIG. 4, the side stiles 116 and 118 and the bottom rail 112 and the top rail 114 are attached, in positions corresponding to those shown in FIG. 2, on the door blank as thus far constructed.

Preferably, the adhesive is applied to both the front-facing surface 181 and the rear-facing surface of the third fiberboard 180. Alternatively, the adhesive can be applied to either the front-facing surface 181 or the rear-facing surface of the third fiberboard 180. As indicated by block 312 in FIG. 4, either the front-facing surface 181 or the rear-facing surface of the third fiberboard 180 can be placed on the rear face 190. Preferably, the rear-facing surface of the third fiberboard 180 is placed on and adhered to the front-facing surface 191 of the rear face 190.

Preferably, the adhesive is applied to both the front-facing surface 171 and the rear-facing surface of the porous layer 170. Alternatively, the porous layer 170 can be placed on the third fiberboard 180 with no adhesive applied to the porous layer 170. Alternatively, the adhesive can be applied to either the front-facing surface 171 or the rear-facing surface of the porous layer 170. As indicated by block 313 in FIG. 4, either the front-facing surface 171 or the rear-facing surface of the porous layer 170 can be placed on the third fiberboard 180. Preferably, the rear-facing surface of the porous layer 170 is placed on the front-facing surface 181 of the third fiberboard 180.

Preferably, the adhesive is applied to both the front-facing surface 161 and the rear-facing surface of the second fiberboard 160. Alternatively, the adhesive can be applied to either the front-facing surface 161 or the rear-facing surface of the second fiberboard 160. As indicated by block 314 in FIG. 4, either the front-facing surface 161 or the rear-facing surface of the second fiberboard 160 can be placed on the porous layer 170. Preferably, the rear-facing surface of the second fiberboard 160 preferably is placed on the front-facing surface 171 of the porous layer 170.

Preferably, the adhesive is applied to both the front-facing surface 151 and the rear-facing surface of the first fiberboard 150. Alternatively, the adhesive can be applied to either the front-facing surface 151 or the rear-facing surface of the first fiberboard 150. As indicated by block 315 in FIG. 4, either the front-facing surface 151 or the rear-facing surface of the first fiberboard 150 can be placed on the second fiberboard 160. Preferably, the rear-facing surface of the first fiberboard 150 is placed on and adhered to the front-facing surface 161 of the second fiberboard 161.

Figure 4:
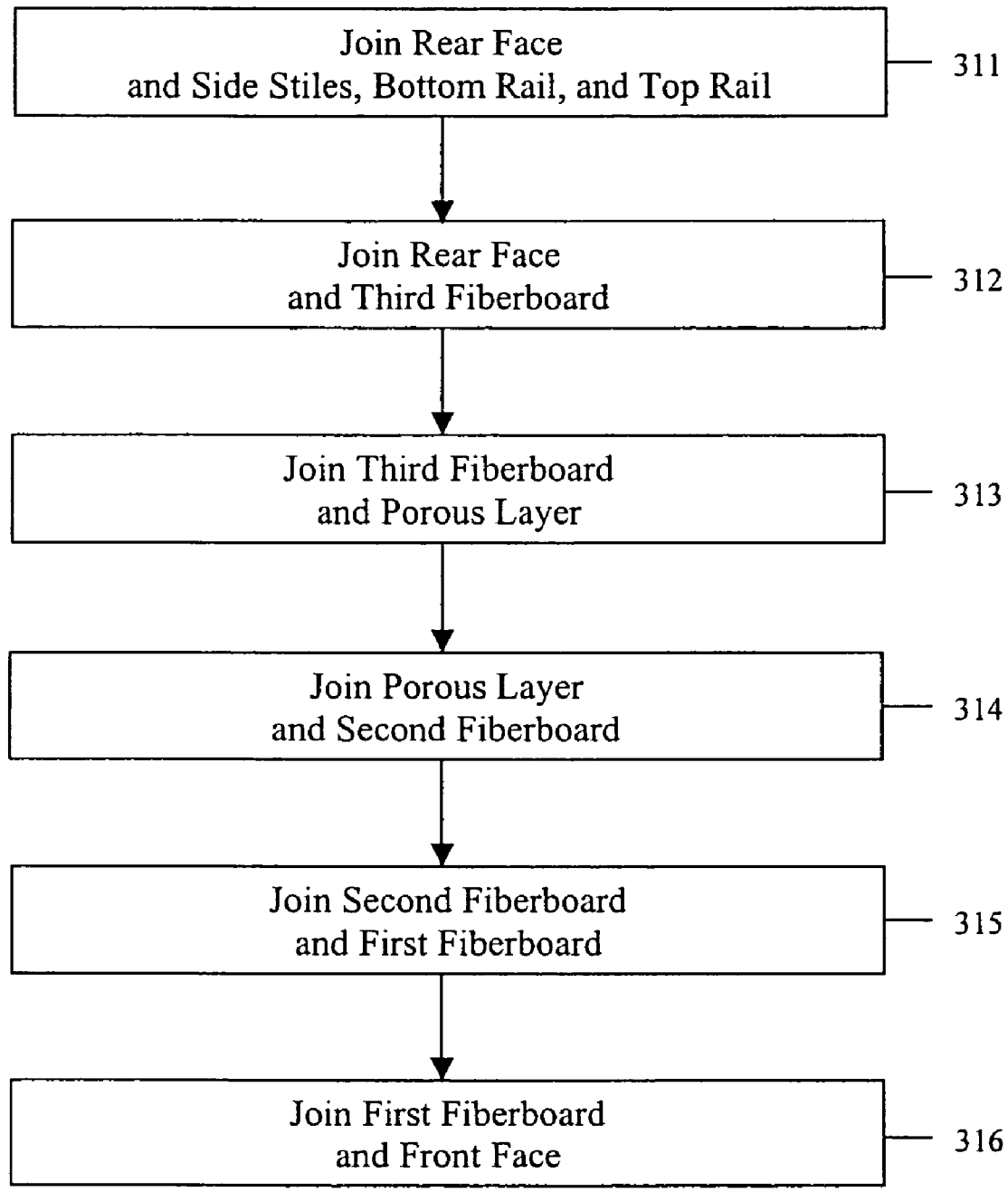
FIG. 4 is a flow diagram of a method of making a door blank of FIG. 1.

As indicated by block 316 in FIG. 4, either the front-facing surface 141 or the rear-facing surface of the front face 140 can be placed on the first fiberboard 150. Preferably, the rear-facing surface of the front face 140 is placed on the front-facing surface 151 of the first fiberboard 150. The door blank of the embodiment has thus been constructed.

As indicated by block 320 in FIG. 3, pressure is applied to the door blank. Preferably, several door blanks are placed one atop the other and placed in a press (not shown) at the same time. Alternatively, only one door is placed in the press. A pressure in a range between 80 and 110 pounds per square inch (psi) is applied to the door blank for 30 minutes. Alternatively, the pressure can be in a range between approximately 80 psi and approximately 110 psi. Alternatively, the time the pressure is applied can be approximately 30 minutes. Alternatively, any other suitable pressure and time can be used. In general, press time will be longer when the ambient temperature is below 65 degrees F. The pressure is removed from the door blank and the adhesive is allowed to adhere for at least approximately eight hours. During this time, the door blank is not manipulated. As indicated by block 330 in FIG. 3, the door blank is cut to a desired width and height. Preferably, the maximum width does not exceed three feet and the maximum height does not exceed eight feet.

As indicated by block 340, a series of grooves 142 are machined into the front face 140 to form the panels 144. Alternatively, the front face 140 can be flush with no panels. Once the panels 144 have been formed, the blank is turned over so that another series of grooves are machined into the rear face 190 to form other panels. The machining is preferably accomplished by routing. Generally, a computer program is written to control a computer numerical control (CNC) milling machine (not shown). The door blank is placed into the milling machine and one side of the door blank is milled according to the design entered into the CNC milling machine. Hardware, such as the door handle 122 is installed. The door 110 can thus be installed into a door frame 132.

Other variations to the embodiments described above are possible. For example, the thickness of any of the layers forming the door can be varied from that described above. Similarly, varying the density of the layers forming the door in the above embodiments is certainly within the ordinary skill in the art.

The embodiments shown in FIG. 2 are an unbalanced core construction; that is, in the embodiments shown in FIG. 2, the number of fire-retardant layers on one side of the porous layer is not equal to the number of fire-retardant layers on the other side of the porous layer. Specifically, the embodiments shown in FIG. 2 include one fire-retardant layer on one side of the porous layer and two fire-retardant layers on the other side of the porous layer. The number of layers on each side of the porous layer can be varied in other embodiments. For example, there can be two layers on one side of the porous layer and three layers on the other side. As another example, there can be an equal number of layers on each side of the porous layer but the thickness of the fire-retardant layers on one side of the porous layer is different than the thickness of the fire-retardant layers on the other side.

Furthermore, a core of the door in accordance with the present invention can have a balanced construction. In order words, a balanced core construction has an equal number of layers on each side of the porous layer. For example, there can be one fire-retardant layer on each side of the porous layer. There can be more than one fire-retardant layer on each side of the porous layer. Moreover, in the balanced construction, the total thickness of fire-retardant layers on one side of the porous layer can be the same as the total thickness of fire-retardant layers on the other side of the porous layer even if the number of layers on each side differs. An example of an embodiment disclosing a balanced construction will be described below.

Figure 5:
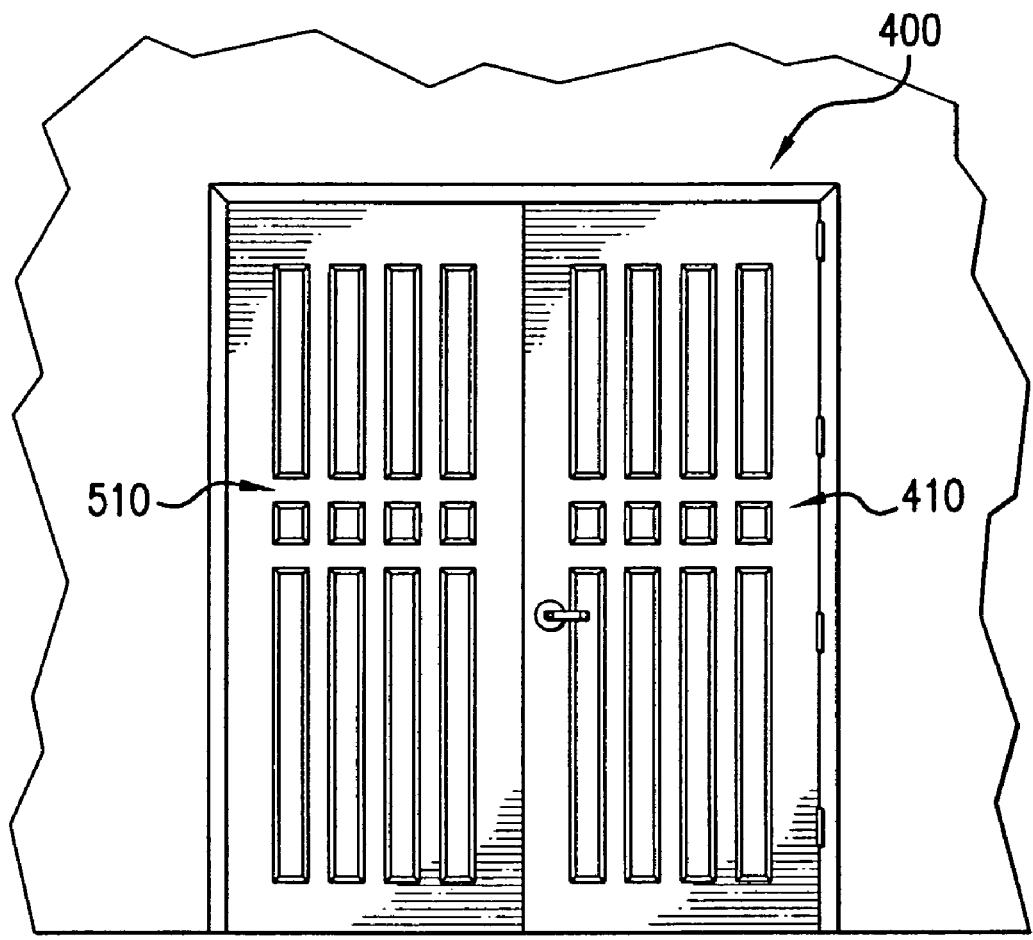
FIG. 5 is a front plan view of a door according to another embodiment of the invention.

FIG. 5 shows a front plan view of a door according to another embodiment of the invention. A standard-pair wood, paneled fire door 400 includes two separate but adjacent-doors, 410 and 510. The door 400 can also be a single-swing door (not shown). As the external appearance of door 400 and door 100 are identical in material respect including the grooves and panels, these identical details will not be repeated. Thus, only the core 430 will be described in detail below. Furthermore, as doors 410 and 510 are identical in material respect, only door 410 will be described in detail.

Figure 6:
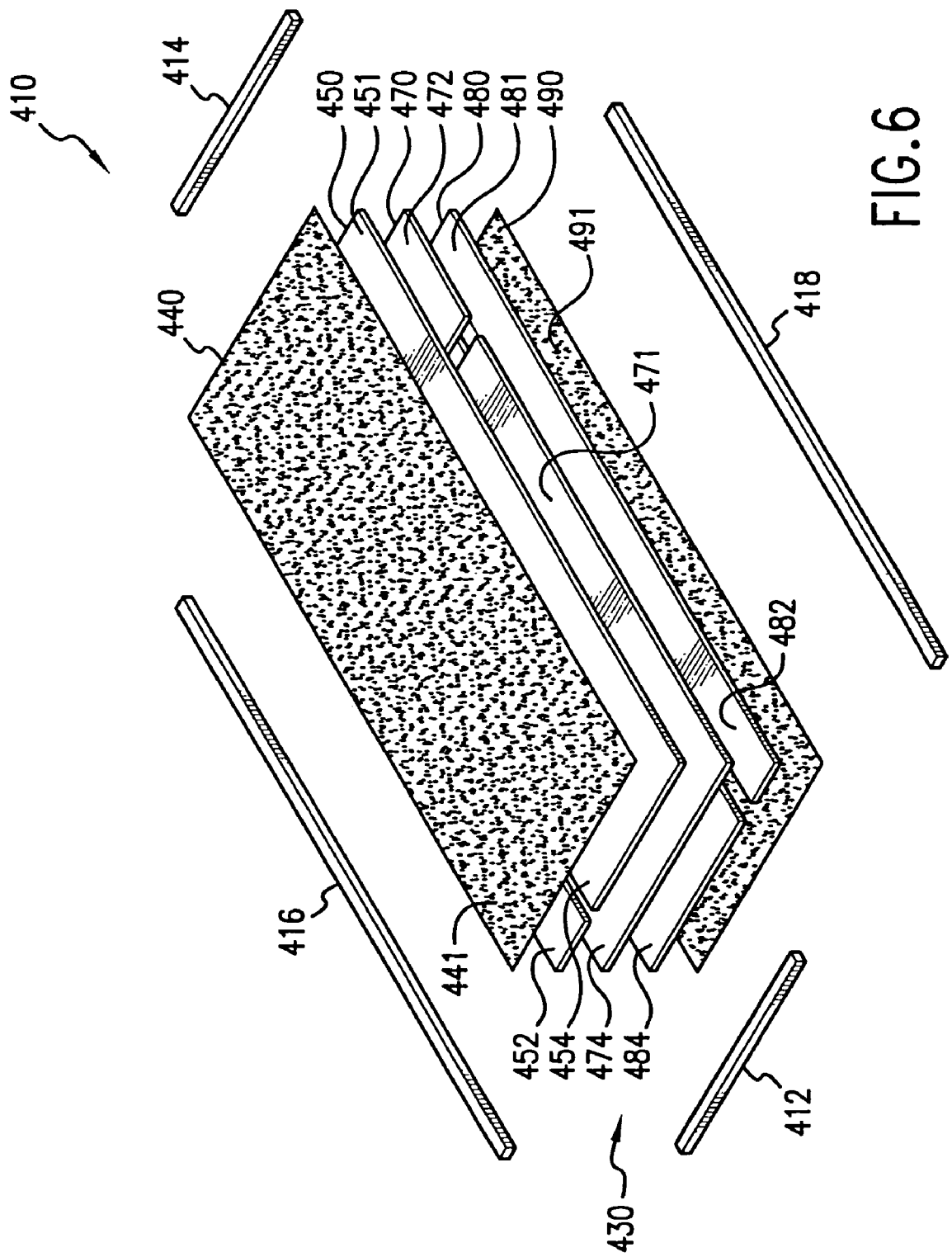
FIG. 6 is a partially-exploded orthogonal view of the door of FIG. 5.

Referring now to FIG. 6, the door 410 includes a core 430, which is disposed between a front face 440 and a rear face 490. The core 430 shown has several layers of material. The layers 450, 470, and 480 may be made of any suitable material. Preferably, at least two of the layers 450 and 480 are made of fire-retardant material. Preferably, the layers of fire-retardant material comprise an MDF. Most preferably, the layers comprise MDF having a density of approximately 42 pcf. The core 430 includes a first fiberboard 450 and a second fiberboard 480. Disposed between the first and second fiberboards 450 and 480 is a layer of porous material 470. The porous layer 470 may be made of any suitable material. Preferably, the porous layer 470 is a foam pad comprised of a thermoplastic polymer, such as expanded polystyrene, having a density of at least 1 pcf.

Each of the first fiberboard 450, the second fiberboard 480, and the porous layer 470 has two major surfaces and a thickness. A height and width of each of the first fiberboard 450, the second fiberboard 480, and the porous layer 470 correspond generally to the height and width of the door 410.

An exemplary embodiment of a core 430 of such a door 410 comprises each of the first fiberboard 450, the second fiberboard 480, and the porous layer 470 having dimensions of three feet wide by eight feet high. In this exemplary embodiment the thickness of each of the first fiberboard 450 and the second fiberboard 480 is nine-sixteenths-of-an-inch and the thickness of the porous layer 470 is three-eighths-of-an-inch. Alternatively, any other suitable dimensions can be provided.

In the embodiment shown in FIG. 6, the first fiberboard 450 can be formed by disposing a vertical splice 452 adjacent to a main sheet 454. Alternatively, the first fiberboard 450 can be a single sheet. The vertical splice 452 is preferably disposed proximate the side stile 416. The width of the vertical splice 452 can be any suitable dimension. For example, the width of the vertical splice can be six inches. The width of both the vertical splice 452 and the main sheet 454 correspond generally to the width of the door 410. Thus, the maximum dimensions of the first fiberboard 450 are three feet wide by eight feet high. The height of the vertical splice 452 is the same as the height of the main sheet 454. Preferably, the dimensions of side stiles 416 and 418 are one-and-one-quarter inches by one-and-one-half inches. Preferably, the dimensions of the bottom rail 412 and the top rail 414 are one-and-one-quarter inches by one-and-one-half inches by thirty-three-and-seven-eighths inches.

The thickness of the first fiberboard 450 shown is nine-sixteenths of an inch. Alternatively, the thickness can be any other suitable thickness. The two major surfaces of the first fiberboard 450 include a front-facing surface 451 and a rear-facing surface (not shown). The front-facing surface 451 and the rear-facing surface of the first fiberboard 450 are disposed on opposing sides of the first fiberboard 450. Either the front-facing surface 451 or the rear-facing surface of the first fiberboard 450 can be disposed adjacent to a rear-facing surface of a front face 440. According to the embodiment, the front-facing surface 451 of the first fiberboard 450 is disposed adjacent to the rear-facing surface of the front face 440. Thus, the rear-facing surface of the first fiberboard 450 is disposed adjacent to one of the major surfaces of the porous layer 470.

Preferably, the porous layer 470 is formed by disposing a horizontal splice 472 adjacent to a main sheet 474. Alternatively, the porous layer 470 can be a single sheet. The horizontal splice 472 is disposed proximate the top rail 414.

Alternatively the horizontal splice 472 is disposed proximate the bottom rail 412. The height of the horizontal splice 472 can be any suitable dimension. For example, the height of the horizontal splice 472 can be 16 inches. The height of both the horizontal splice 472 and the main sheet 474 corresponds to the height of the door 410. Thus, the maximum dimensions of the porous layer 470 are three feet wide by eight feet high. The width of the horizontal splice 472 is the same as the width of the main sheet 474. The thickness of the porous layer 470 is three-eighths of an inch. Alternatively, the thickness can be any other suitable thickness.

The two major surfaces of the porous layer 470 include a front-facing surface 471 and a rear-facing surface (not shown). The front-facing surface 471 and the rear-facing surface of the porous layer 470 are disposed on opposing sides of the porous layer 470. Either the front-facing surface 471 or the rear-facing surface of the porous layer 470 can be disposed adjacent to the rear-facing surface of the first fiberboard 450. According to this embodiment, the front-facing surface 471 of the porous layer 470 is disposed adjacent to the first fiberboard 450. Thus, the rear-facing surface of the porous layer 470 is disposed adjacent to one of the major surfaces of the second fiberboard 480.

The second fiberboard 480 is formed by disposing a vertical splice 482 adjacent to a main sheet 484. Alternatively, the second fiberboard 480 can be a single sheet. The vertical splice 482 is disposed proximate the side stile 416. Alternatively, the vertical splice 482 can be disposed proximate the side stile 414. The width of the vertical splice 482 can be any suitable dimension. For example, the width of the vertical splice 482 can be six inches. Preferably, the width of both the vertical splice 482 and the main sheet 484 corresponds to the width of the door 410. Thus, the maximum dimensions of the second fiberboard 480 are three feet wide by eight three high. The height of the vertical splice 482 is the same as the height of the main sheet 484.

The thickness of the second fiberboard 480 is preferably nine-sixteenths of an inch. Alternatively, the thickness can be any other suitable thickness. The two major surfaces of the second fiberboard 480 include a front-facing surface 481 and a rear-facing surface (not shown). The front-facing surface 481 and the rear-facing surface of the second fiberboard 480 are disposed on opposing sides of the second fiberboard 480. Either the front-facing surface 481 or the rear facing surface of the second fiberboard 480 can be disposed adjacent to the rear-facing surface of the porous layer 470. According to this embodiment, the front-facing surface 481 of the second fiberboard 480 is disposed adjacent to the rear-facing surface of the porous layer 470. Thus, the rear-facing surface of the second fiberboard 480 is disposed adjacent to one of the major surfaces of the rear face 490.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A door comprising:
   a porous layer having two opposing major surfaces;
   at least three fire-retardant layers each comprising a fiberboard and coupled with the porous layer in an unbalanced construction, wherein a number of the at least three fire-retardant layers disposed on one of the two opposing major surfaces of the porous layer is greater than a number of the at least three fire-retardant layers disposed on another one of the two opposing major surfaces of the porous layer;
   a first exterior layer; and
   a second exterior layer, wherein the first exterior layer is coupled with one of the at least three fire retardant layers and the second exterior layer is coupled with another one of the at least three fire-retardant layers.

2. The door according to claim 1, wherein a density of the porous layer is at least one pound per cubic foot.

3. The door according to claim 1, wherein a thickness of each of the at least three fire-retardant layers is about the same.

4. The door according to claim 3, wherein the thickness of each of the at least three fire-retardant layers is about three-eights of an inch.

5. The door according to claim 3, wherein a thickness of the porous layer is about the same as the thickness of each of the at least three fire-retardant layers.

6. The door according to claim 5, wherein the thickness of the porous layer is about three-eights of an inch.

7. The door according to claim 1, wherein the porous layer comprises a thermoplastic polymer having a density of about one pound per cubic foot.

8. The door according to claim 1, wherein the porous layer comprises a fire-retardant material.

9. The door according to claim 1, wherein the fiberboard comprises a medium-density fiberboard.

10. The door according to claim 9, wherein a density of the medium-density fiberboard is at least 42 pounds per cubic foot.

11. The door according to claim 1, wherein a thickness of the first exterior layer is about the same as a thickness of the second exterior layer.

12. The door according to claim 11, wherein the thickness of the first exterior layer is about one-eighth of an inch.

13. The door according to claim 1, wherein each of the first and second exterior layers comprises a hard board.

14. The door according to claim 13, wherein a density of the hardboard is at least 52 pounds per cubic foot.

15. The door according to claim 1, further comprising a grooved first pattern disposed on the first exterior layer and having a first depth and a grooved second pattern disposed on the second exterior layer and having a second depth, wherein the first depth penetrates a thickness of the first exterior layer and a portion of a thickness of one of the at least three fire-retardant layers.

16. The door according to claim 15, wherein the second depth penetrates a thickness of the second exterior layer and a portion of a thickness of the another one of the at least three fire-retardant layers.

17. The door according to claim 16, wherein the first and second depths are about the same.

\* \* \* \* \*

UNITED STATES PATENT AND TRADEMARK OFFICE
CERTIFICATE OF CORRECTION

PATENT NO. : 7,721,500 B2
APPLICATION NO. : 11/656628
DATED : May 25, 2010
INVENTOR(S) : Randy Jon Clark et al.

It is certified that error appears in the above-identified patent and that said Letters Patent is hereby corrected as shown below:

Column 2
Line 2, change "eights" to --eighths--.

Column 2
Line 3, change "eights" to --eighths--.

Column 2
Line 5, change "eights" to --eighths--.

Column 5
Line 42, change "eights" to --eighths--.

Column 6
Line 57, change "eights" to --eighths--.

Column 7
Line 29, change "thicknesses" to --thickness--.

Column 7
Line 57, change "commercially available" to --commercially-available--.

Column 7
Line 60, change "2F." to --2F--.

Column 8
Line 46, after "160" delete "preferably".

Column 9
Line 50, change "order" to --other--.

Signed and Sealed this

Seventh Day of December, 2010

David J. Kappos
*Director of the United States Patent and Trademark Office*

Column 9
Line 64, change "adjacent-" to --adjacent--.

Column 9
Line 67, change "respect including" to --respect-including--.

Column 12
Line 24, change "eights" to --eighths--.

Column 12
Line 29, change "eights" to --eighths--.

Column 12
Line 46, change "hard board" to --hardboard--.